United States Patent [19]

Nikolsky et al.

[11] Patent Number: 4,603,002

[45] Date of Patent: Jul. 29, 1986

[54] METHOD AND COOLING AGENT FOR FREEZING AND STORING PRODUCTS

[75] Inventors: Vladimir A. Nikolsky; Valery M. Yagodin, both of Kiev; Evgeny N. Vazhnov, Moscow; Efim S. Bondar, Kiev; Igor P. Naumenko, Kiev; Valery F. Vozny, Kiev; Vladimir N. Orlov, Kiev; Vladimir I. Tikhokov, Kiev, all of U.S.S.R.

[73] Assignee: Vsesojuzny Nauchno-Issledova-Telsky Experimentalno-Kontstruktorsky Institut Elektrobytovykh Mashin I Priborov, U.S.S.R.

[21] Appl. No.: 675,605

[22] Filed: Nov. 28, 1984

Related U.S. Application Data

[62] Division of Ser. No. 311,059, Oct. 13, 1981, Pat. No. 4,495,776.

[51] Int. Cl.$^4$ ............................................... C09K 5/04
[52] U.S. Cl. ..................................................... 252/67
[58] Field of Search ......................................... 252/67

[56] References Cited

U.S. PATENT DOCUMENTS

| | | | |
|---|---|---|---|
| 3,019,614 | 2/1962 | Schubert et al. | 252/67 |
| 3,872,682 | 3/1975 | Shook | 62/114 |
| 4,283,919 | 8/1981 | Vakil | 62/114 |
| 4,510,064 | 4/1985 | Ermak | 252/67 |

FOREIGN PATENT DOCUMENTS

| | | | |
|---|---|---|---|
| 473740 | 9/1965 | U.S.S.R. | 252/67 |
| 579296 | 11/1977 | U.S.S.R. | 252/67 |

OTHER PUBLICATIONS

Chaikovskii et al., "Properties and Use of Mixtures of Agents in Compression Refrigerating Machines", Kholod. Tekh. Tekhnol. 1972, No. 15, 56–61.

Primary Examiner—Paul Lieberman
Assistant Examiner—Robert A. Wax
Attorney, Agent, or Firm—Steinberg & Raskin

[57] ABSTRACT

A method comprises complete liquefaction of the cooling agent, before its cooling is carried out, by dissolving in the components of the mixture liquefied at the working pressure, those of which are in the vapor phase at the working pressure. The cooling agent includes difluorodichloromethane in the amount of 10–15 vol. %, a component having a normal boiling point within the range from −55° C. to 85° C. in the amount 10–50 vol. %, a component having a normal boiling point within the range from −30° C. to 55° C. in the amount of 10–50 vol. %, and a component having a normal boiling point within the range from 16° C. to 35° C. in the amount of 10–75 vol. %. The use in home refrigerators of the cooling agent of the present invention considerably increases maximum specific cold capacity of the refrigeration unit.

15 Claims, 2 Drawing Figures

METHOD AND COOLING AGENT FOR FREEZING AND STORING PRODUCTS

This is a division of application Ser. No. 311,059, filed 10/13/81, now U.S. Pat. No. 4,495,776.

BACKGROUND OF THE INVENTION

The invention relates to the refrigeration engineering, and more particularly it deals with methods and cooling agent for freezing and storing products.

The invention may be used in the food industry, in the household and medicine for cooling and freezing, and also for a short- and long-term storage of any products, both food and biological, as well as in other fields of technology wherever it is necessary to obtain and maintain cold at a level of minus 24° C. and below at minimum energy requirements.

A method for freezing and storing products in home compression refrigerators is widely known. It consists in loading products into one or several refrigerator compartments. The following temperature conditions are provided in the compartments; a temperature in the compartment for freezing and long-term storage in the regime of freezing shall not be above −24° C. and maximum −18° C. for the long-storage function; a temperature within the range from 0° C. to 5° C. should be maintained in the compartment intended for a short-term storage. A short-term storage is from 2 to 7 days, and the long-term storage up to ten months depending on the type of product.

Such temperature conditions are provided by using known cooling techniques.

One of the most energy-effective methods consists in obtaining cold using a vapour compression refrigerator unit in which a closed-circuit cycle of cooling agent circulation is employed. A cooling agent boils (evaporates) in an evaporator at a lower pressure $P_o$ and at a low temperature. The heat required for the boiling is taken off cooled objects so that their temperature decreases. The resultant vapour is taken off by a compressor, compressed therein to a condensation pressure $P_1$ and fed to a condenser to be cooled with water or air. Owing to the heat removal from the vapour, the vapour is condensed. The resultant liquid cooling agent is returned back through a throttling member in which its temperature and pressure decrease to an evaporator for re-evaporation so that the cycle of operation of the refrigeration unit is thus closed.

It is generally known that, in order to improve the cost effectiveness of a compression refrigeration unit, its specific cold capacity should be increased, e.g. by improving the specific volumetric cold capacity of the refrigeration unit or by improving the volumetric efficiency of a compressor. It is also a common knowledge that the value of the volumetric efficiency of a compressor is inversely proportional to a suction pressure.

For achieving temperatures enabling freezing of products, that is −24° C. and below, units with high $P_1/P_o$ ratios, hence low volumetric efficiency and low specific cold capacity are used in refrigeration apparatus.

Known in the art are methods of obtaining cold by using two- and multistage refrigeration units, comprising compressing a cooling agent from a boiling pressure to a condensation pressure not at once but gradually at two or several series connected stages with an intermediate cooling of partially compressed vapour.

The ratio of discharge pressure to suction pressure of a cooling agent at each stage is lower than the ratio of condensation pressure to boiling pressure, between which is effected the cycle of the staged unit (cf. French lay-open application No. 2182137, 1974, Cl. F 25 B 1/10, British lay-open application No. 1434927, 1976, Cl. F 4H).

A closed circuit cycle of a cooling agent circulation is employed in two- and multistage compression refrigeration units implementing the known methods of cold production, wherein a cooling agent comprises ammonia and fluorine-containing saturated hydrocarbons, mainly methane and ethane derivatives.

The prior art methods provide for producing cold at a temperature level of −24° C. and below. Moreover, they also provide for obtaining temperatures within the range of 0° to +5° C. which are necessary for storing cooled products.

The prior art methods are, however, complicated because of a gradual compression of a cooling agent in several stages with an intermediate cooling of partially compressed vapour.

Sophisticated refrigeration units having several compressors, throttles, coolers, evaporators, and other devices are required for carrying out such prior art methods. Furthermore, the use of several compressors results in an increased energy consumption and lower reliability.

Also known in the art is a method for producing cold at a temperature level of 0° C. to +5° C. and −18° C. and below using individual refrigeration units for each temperature range (cf. German lay-open application No. 2736370, 1979, Cl. F 25 B 49/00). Each refrigeration unit functions in accordance with a known vapour compression cycle using mainly difluorodichloromethane as a cooling agent.

However, this prior art method for producing cold exhibits a low specific cold capacity at the low-temperature level and requires much energy. This is due to the fact that, to obtain low temperatures (−18° C.) and below, a greater difference in temperatures of boiling and condensation, hence a greater value of the ratio of the condensation pressure $P_1$ to the boiling pressure $P_o$, is required. With an increase in the ratio of these pressures, the volumetric efficiency and general efficiency of the compressor decrease to lower the specific cold capacity of the refrigeration unit and to raise the power requirements.

Also known in the art are methods of producing cold at a level of temperatures enabling cooling, freezing and storage of products with lower energy consumption, but such methods are associated with a complication of the cycle of a vapour compression refrigeration unit adding auxiliary operations with a cooling agent, and namely:

accumulation of a liquid cooling agent and its partial evaporation before the throttling stage (cf. U.S. Pat. No. 3,950,961, 1976, Cl. 62-149);

circulation of a liquid cooling agent along two circuits, each having an evaporator for evaporating the coolant agent at temperature levels of +5°, −0° C. and −18° C. and below (cf. British patent specification No. 1199267, 1970, Cl. F4H).

Though such methods can slightly reduce energy consumption, they require refrigeration units of a sophisticated design with lower reliability for their implementation.

At the same time, an optimum heat exchange process may be obtained using a cooling agent comprising a mixture of components to substantially improve the efficiency of compression and specific cold capacity of a refrigeration unit.

It is known that a high specific cold capacity may be obtained using mixtures of those cooling agents which have different boiling points. A particular feature of multicomponent cooling agents resides in that a high boiling component is condensed from a compressed mixture at the first condensation stage and a low boiling component is condensed at the second stage. The condensed components are caused to expand and boil at different temperature levels to provide required cooling and freezing conditions.

The employment of binary and multicomponent cooling agents makes it possible to obtain different boiling temperatures in evaporators without any auxiliary devices (cf. USSR Pat. No. 312429, 1971, Cl. F 25 B 5/00; USSR Inventor's Certificate No. 616493, 1978, Cl. F 25 B 1/00).

The prior art of this invention is a method for producing cold using a single-stage compression-type refrigeration unit functioning with a closed-circuit cycle, wherein a cooling agent in the form of a mixture of components boiling at different temperatures is compressed in a compressor to a pressure of 20 kg/cm$^2$, partially liquefied by condensing a component with a higher boiling point, the mixture is completely compressed by cooling the forward flow by a reverse flow in a regeneration heat-exchanger, the components immiscible in the liquid state are mixed in a homogenization zone to obtain a homogeneous mixture, the resultant homogeneous mixture is throttled to a pressure of 3 kg/cm$^2$, partially evaporated by evaporating the component boiling at a lower temperature in the evaporator zone, and the mixture is then completely evaporated by evaporating the component boiling at a higher temperature in the zone of the regeneration heat exchanger (cf. U.S. Pat. No. 3,872,682, 1975, Cl. 62-114).

The component boiling at a lower temperature is CO$_2$ having a normal boiling point $-79.8°$ C., and the component boiling at a higher temperature is, e.g. difluorodichloromethane having a normal boiling point $-29.8°$ C.

This method makes it possible to obtain a temperature for cooling, freezing and storing products, but it exhibits a low specific cold capacity and considerable power requirements.

Known in the art are cooling agents for a vapour compression refrigeration unit functioning with a closed-circuit cycle, comprising a mixture of gaseous components, including ethane and propane (cf. USSR Inventor's Certificate No. 534484, 1976, Cl. C 09 K 5/00).

These cooling agents have an inadequate specific volumetric cold capacity and are less economical when a refrigeration unit functions in the range of compression pressures of 8 to 14 kg/cm$^2$.

Also known in the art are cooling agents for a compression refrigeration unit functioning with a closed-circuit cycle, comprising difluorodichloromethane and a mixture of hydrocarbons: ethane in an amount of between 20 and 40 vol. %, propane in an amount between 10 and 30 vol. %, isobutane in an amount between 10 and 30 vol.%, and n-butane in an amount between 10 and 30 vol.%.

These cooling agents are, however, explosion- and fire-hazardous so that they cannot be used in home refrigerators upon which stringent requirements are imposed for explosion and fire safety.

Moreover, the employment of such cooling agents encounters serious difficulties in the batch production of refrigerators.

SUMMARY OF THE INVENTION

It is an object of the invention to provide a method and a cooling agent for freezing and storing products which enable an improvement of a specific cold capacity while providing desired temperature conditions both for the cooling and freezing functions and for the product storage function.

This is accomplished by a method for freezing and storing products in home compression refrigerators using a cooling agent comprising a mixture of components boiling at different temperatures and in which the coolant agent is subjected to the following sequence of operations in the following order: compression to a working pressure, partial liquefaction to form a liquid and vapour mixture, complete liquefaction, cooling, throttling, partial and complete evaporation of the cooling agent. According to the invention, complete liquefaction of the cooling agent before its cooling is effected by dissolving in components of the mixture liquefied at the working pressure, the components which are in the vapour phase at the working pressure.

For effecting complete liquefaction of the cooling agent, the cooling agent is preferably precompressed to a pressure between 10 and 14 kg/cm$^2$.

In home compression refrigerators having at least two compartments, it is preferred to evaporate the cooling agent partially for providing temperatures enabling freezing and long-term storage in one of the refrigeration compartments, and to evaporate the cooling agent completely for providing temperatures enabling a short-term storage of products, the cooling agent being preferably throttled to a pressure between 0.5 and 3 kg/cm$^2$.

A cooling agent may be based on difluorodichloromethane also containing at least one component having a normal boiling point within the range from $-55°$ C. to $-85°$ C. in an amount of between 10 and 50 vol.% such as CO$_2$ or trifluoromonochloromethane, or trifluoromonobromomethane, a component having a normal boiling point within the range from $-30°$ C. to $-55°$ C. in an amount of between 10 and 50 vol.% such as difluoromonochloromethane, propane, and at least one component having a normal boiling point within the range from $+16°$ C. to $-30°$ C. in an amount of between 10 and 75 vol.% such as difluoromonochloroethane, difluoromonochlorobromomethane, octafluorocyclobutane. Difluorodichloromethane being used in an amount of between 10 and 50 vol.%.

The cooling agent may contain the components in the following proportioning (in vol.%):

| | |
|---|---|
| trifluoromonochloromethane | 10–50 |
| difluoromonochloromethane | 10–15 |
| octafluorocyclobutane | 20–70 |
| difluorochloromethane | the balance, |
| or | |
| difluorochloromethane | 10–15 |
| trifluoromonobromomethane | 10–50 |
| octafluorocyclobutane | 20–70 |
| difluoromonochloromethane | the balance, |
| or | |
| difluorochloromethane | 10–15 |

| -continued | |
|---|---|
| trifluoromonochloromethane | 10–50 |
| difluoromonochloroethane | 20–70 |
| difluoromonochloromethane or | the balance, |
| difluorodichloromethane | 10–15 |
| trifluoromonochloromethane | 10–50 |
| difluoromonochlorobromomethane | 10–70 |
| difluoromonochloromethane or | the balance, |
| difluorodichloromethane | 10–20 |
| trifluoromonochloromethane | 5–30 |
| octafluorocyclobutane | 20–60 |
| trifluoromonobromomethane | 5–30 |
| difluoromonochloromethane or | the balance, |
| $CO_2$ | 10–45 |
| difluorodichloromethane | 10–35 |
| difluoromonochloromethane | 10–35 |
| difluoromonochloroethane | 25–75. |

The use of the method and cooling agent for freezing and storing products according to the invention ensures a substantial improvement of the specific cold capacity of refrigeration units in which the method and cooling agent are employed, and also improves cost effectiveness and reliability of such refrigeration units.

BRIEF DESCRIPTION OF THE DRAWINGS

Other objects and advantages of the invention will become apparent from the following description of the invention with reference to the accompanying drawings, in which.

DETAILED DESCRIPTION OF PREFERRED EMBODIMENTS

A method for freezing and storing products in home compression refrigerators consists in loading products into one or several refrigeration compartments in which desired temperature conditions are provided.

Figure 1:
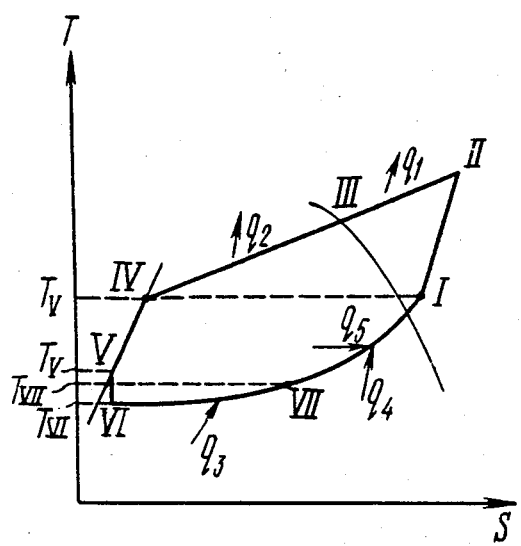
FIG. 1 shows a cycle of operation of a home compression refrigerator given in the form of a diagram in coordinates temperature v. entropy.
Figure 2:
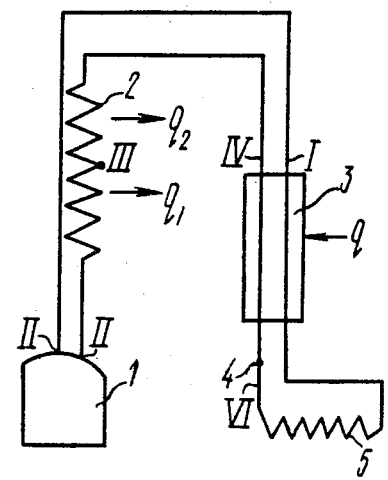
FIG. 2 shows a schematic diagram of a refrigeration unit for carrying out the method according to the invention.

A temperature of maximum −24° C. for the freezing function and −18° C. for the storage function is maintained in the freezing and long-storage compartment. A temperature within the range from 0° C. to +5° C. is maintained in a short-term storage compartment for all functions of the refrigerator. These temperature conditions are provided owing to the fact that a cooling agent is subjected to the following sequence of operations also illustrated in FIGS. 1 and 2:

A cooling agent is compressed (process I-II in FIG. 1) in a compressor 1 (FIG. 2), cooled (process II-III) with the removal of heat ($q_1$) into the environment, then partially condensed in a condenser 2 for the formation of a liquid and vapour mixture. Non-condensed components of a cooling agent are dissolved in condensed components (process III-IV) with the removal of heat ($q_2$). Subsequently the cooling agent is fed to a heat exchanger or evaporator 3 where it is cooled to a temperature $T_V$ (process (IV-V). The cooling agent is then throttled through a throttle 4 with a temperature decrease from $T_V$ to $T_{VI}$ (process (V-VI) and is fed to an evaporator 5 of the freezing and long-term storage compartment with the removal of heat ($q_3$) from this compartment during long-term storage and from the products in the freezing function (process VI-VII), the cooling agent being heated and evaporated only partially and being in a liquid and vapour phase. Subsequently the cooling agent which is in the liquid and vapour phase is fed to the heat exchanger or evaporator 3 in which the cooling agent is evaporated completely to remove heat ($q_4$) from the short-term product storage compartment and to remove heat ($q_5$) from the compressed cooling agent fed to the heat exchanger 3 from the condenser 2.

The cooling agent is then fed to the compressor 1 for re-compression.

The ratio of the pressure of compressed cooling agent (referred to below as cooling agent) to the pressure of expanded cooling agent or a compression ratio $P_1/P_2$ is substantially lower compared to known methods. Thus, the compression ratio of a refrigeration unit using a widely known method of freezing and storage with the employment of Freon-12 is 14. Optimum value of compression ratio for the method according to the invention is only from 3 to 5. Lower compression ratio results in an improved volumetric efficiency of the compressor which is equal to the ratio of the actual hour capacity of the compressor to the ideal capacity, that is to the volume described by the piston during one hour. Lowering the compression ratio from 14 to 4 results in a 2–3-fold increase in the volumetric efficiency of the compressor, hence in a 2–3-fold improvement of the compressor efficiency and substantial improvement of the efficiency of the refrigeration unit. This brings about a reduction of specific energy consumption for freezing and storing products.

For a complete liquefaction of a cooling agent, it is compressed to a pressure between 10 and 14 kg/cm², and to evaporate the cooling agent finally, it is enough to throttle it to a pressure between 0.5 and 3 kg/cm².

In case a cooling agent is compressed to a pressure below 10 kg/cm² or above 14 kg/cm² and throttled to a pressure below 0.5 kg/cm² or above 3 kg/cm², the process of liquefaction of the cooling agent and its evaporation cannot provide for a desired improvement in the specific cold capacity of the refrigeration unit.

The implementation of the method according to the invention will become apparent from the following embodiment thereof.

A cooling agent in the vapour phase was liquefied in the compressor 1 to a pressure between 10 and 14 kg/cm² and was fed to the condenser 2. The cooling agent was cooled in the condenser 2 to give up heat to the environment (air or water). Owing to the heat removal from the cooling agent vapour, its components boiling at higher temperature were condensed, that is the cooling agent was partially liquefied to form a liquid and vapour mixture, while still being at a higher pressure.

At this pressure and at a temperature between 20° and 45° C., a complete liquefaction of the cooling agent was effected by dissolving its components boiling at lower temperature which were in the vapour phase under such conditions, in the liquefied components.

The liquefied cooling agent was cooled in the heat exchangers 3 with a liquid and vapour emulsion, which was formed owing to the partial evaporation of the cooling agent in the evaporator which was fed in the form of a reverse flow to the heat exchanger.

The cooled cooling agent was then fed through the throttle 4 in which its pressure and temperature were reduced, to the evaporator 5. During the throttling the pressure of the cooling agent was reduced to 0.5–3 kg/cm².

The cooling agent boiled (evaporated) in the evaporator 5, a desired amount of heat was removed from objects being cooled so that their temperature decreased as much as to −30° C. This is the process of partial evaporation during which a major part of components with a lower boiling point are evaporated. After the liquid and vapour mixture have left the evaporator 5, the evaporation of the component with lower boiling point was over, and components of the cooling agent having a higher boiling point started evaporating. The process of complete evaporation of the cooling agent was effected in the heat exchanger 3 in which the heat required for the cooling agent boiling was taken off the forward flow as a result of the heat exchange between the forward and reverse flows. The resultant cooling agent vapour was taken off by the compressor 1 for the re-compression thus closing the cycle of operation of the refrigeration unit.

It is preferable to maintain the delivery pressure of 12 kg/cm² and the suction pressure of 3 kg/cm².

By dissolving non-liquefied components of the cooling agent in its liquefied components in the refrigeration cycle of a single-stage compression refrigeration machine, a complete liquefaction of the cooling agent may be achieved at a lower condensation pressure, hence at a lower delivery pressure. This makes it possible to reduce the ratio of the delivery pressure to the suction pressure thus improving the specific cold capacity of the refrigeration unit and the efficiency of the compressor owing to a reduction of energy losses in the compressor.

For carrying out the method according to the invention, it is necessary to choose a cooling agent in such a manner to ensure desired temperatures for storage and freezing at optimum lowered value of the compression ratio.

For that purpose, a cooling agent contains difluorodichloromethane with a normal boiling temperature of −29.8° C. and also components having a normal boiling temperature within the range from −55° C. to −85° C., a component having a normal boiling point within the range from −30° C. to −55° C., and components having a normal boiling point within the range from +16° C. to −30° C.

Such components may comprise any widely known compounds such as CO₂, trifluoromonochloromethane, trifluoromonobromomethane having a normal boiling (sublimation) point of −79.8° C., −81° C., −57° C., −75° C., respectively; difluoromonochloromethane, propane having a normal boiling point of −40.8° C., −40° C., respectively; difluoromonochloroethane, difluoromonochlorobromomethane, octafluorocyclobutane having a normal boiling point of −9.25° C., −3.4° C., −5.8° C., respectively.

Using cooling agents of the following composition minimum cost and maximum effectiveness may be achieved:

(1) difluorodichloromethane, trifluoromonochloromethane, difluoromonochloromethane, difluoromonochloroethane;
(2) CO₂, difluorodichloromethane, difluoromonochloromethane, difluoromonochloroethane;
(3) trifluoromonochloromethane, difluorodichloromethane, octafluorocyclobutane, difluorodichloromethane;
(4) difluorodichloromethane, trifluoromonochloromethane, difluoromonochloriethane, difluoromonochloromethane;
(5) difluorodichloromethane, trifluoromonochloromethane, difluoromonochlorobromomethane, difluoromonochloromethane;
(6) difluorodichloromethane, trifluoromonochloromethane, octafluorocyclobutane, trifluoromonobromomethane, difluoromonochloromethane; and any other possible combinations.

The components are preferably proportioned as follows (vol.%):

| | |
|---|---|
| trifluoromonochloromethane | 10–50 |
| difluoromonochloromethane | 10–15 |
| octafluorocyclobutane | 20–70 |
| difluorodichloromethane | the balance; |
| or | |
| difluorodichloromethane | 10–15 |
| trifluoromonobromomethane | 10–50 |
| octafluorocyclobutane | 20–70 |
| difluoromonochloromethane | the balance; |
| or | |
| difluorodichloromethane | 10–15 |
| trifluoromonochloromethane | 10–50 |
| difluoromonochloroethane | 20–70 |
| difluoromonochloromethane | the balance; |
| or | |
| difluorodichloromethane | 10–20 |
| trifluoromonochloromethane | 5–30 |
| octafluorocyclobutane | 20–60 |
| trifluoromonobromomethane | 5–30 |
| difluoromonochloromethane | the balance; |
| or | |
| CO₂ | 10–45 |
| difluorodichloromethane | 10–35 |
| difluoromonochloromethane | 10–35 |
| difluoromonochloroethane | 25–75. |

In case the low-boiling components are used within ranges smaller than those specified above and the high-boiling components are used within ranges greater than those specified above, necessary temperature conditions in refrigerator compartments cannot be provided, that is the temperature in the short-term-storage compartment will be below 0° C. and the temperature in the long-term storage compartment will not reach −18° C.

In case the low-boiling components are used within ranges greater than those specified above and the high-boiling components are used within ranges smaller than those specified above, the low-boiling components will not be able to dissolve in the high-boiling components, hence desired temperature conditions will not be provided in the short-term storage compartment, that is the temperature in this compartment will be above +5° C.

Each cooling agent is a mixture of components stored in pressurized bottles. A quantity of each component of a volume corresponding to a pre-set percentage of this component in the mixture is discharged from each bottle to a common receiver. First a component having the lowest pressure of liquefied gas vapour, and namely octafluorocyclobutane, difluoromonochloroethane, difluoromonochlorobromomethane, difluorochloromethane is discharged from the bottle to the receiver, then gases with a greater pressure of liquefied gas vapour such as difluoromonochloromethane, trifluoromonobromomethane, trifluoromonochloromethane.

Examples of possible modifications of combinations of components for preparing a cooling agent according to the invention are given below:

EXAMPLE 1

The following components are mixed: difluorodichloromethane, $CO_2$, difluoromonochloromethane and difluoromonochloroethane to prepare a cooling agent having the following composition (in vol.%):

| | |
|---|---|
| difluorodichloromethane | 20 |
| $CO_2$ | 14 |
| difluoromonochloromethane | 20 |
| difluoromonochloroethane | 46 |

When used in home refrigerators, such coolant ensures a compression ratio of between 4 and 5 and provides desired temperature conditions in refrigeration compartments: from 0° C. to +5° C. in the short-term storage compartment, maximum −24° C. in the freezing and long-term storage compartment for the freezing function and −18° C. for the long-term storage function.

EXAMPLE 2

The following components are mixed in a container: difluorodichloromethane, trifluoromonochloromethane, difluoromonochloromethane, octafluorocyclobutane to prepare a coolant having the following composition (vol.%):

| | |
|---|---|
| difluorodichloromethane | 22 |
| trifluoromonochloromethane | 10 |
| trifluoromonobromomethane | 22 |
| difluoromonochloromethane | 22 |
| octafluorocyclobutane | 24. |

This cooling agent ensures a compression ratio of the compressor between 4 and 5 and maintenance of the following temperature conditions: from 0° C. to +5° C. in the short-term storage compartment and maximum −24° C. in the long-term storage and freezing compartment for the freezing function and −18° C. for the long-term storage function.

EXAMPLE 3

The following components are mixed in a container: difluorodichloromethane, trifluoromonochloromethane, difluoromonochloromethane and difluoromonochloroethane to prepare a cooling agent having the following composition (vol.%):

| | |
|---|---|
| difluorodichloromethane | 25 |
| trifluoromonochloromethane | 20 |
| difluoromonochloromethane | 25 |
| difluoromonochloroethane | 30. |

EXAMPLE 4

A cooling agent having the following composition (in vol.%) was prepared by the above-described method:

| | |
|---|---|
| difluorodichloromethane | 10 |
| trifluoromonochloromethane | 15 |
| difluoromonochloromethane | 25 |
| difluoromonochloroethane | 50. |

EXAMPLE 5

A cooling agent having the following composition (vol.%) was prepared by the above-described method:

| | |
|---|---|
| difluorodichloromethane | 20 |
| trifluoromonochloromethane | 20 |
| difluoromonochloromethane | 10 |
| difluoromonochloroethane | 50. |

EXAMPLE 6

A cooling agent having the following composition (vol.%) is prepared by the above-described method:

| | |
|---|---|
| difluorodichloromethane | 20 |
| trifluoromonochloromethane | 15 |
| difluoromonochloromethane | 25 |
| difluoromonochloroethane | 40. |

The cooling agents of Examples 3 through 6 ensured the achievement of compression ratio between 4 and 5 and provided in the refrigeration compartments of a compression refrigerator the above-mentioned desired temperature conditions.

In addition to the above-described compositions, the following mixtures can be prepared to provide the desired temperature conditions:

EXAMPLE 7

| | |
|---|---|
| difluorodichloromethane | 15 |
| trifluoromonobromomethane | 50 |
| octafluorocyclobutane | 20 |
| difluoromonochloromethane | 15. |

EXAMPLE 8

| | |
|---|---|
| difluorodichloromethane | 15 |
| trifluoromonobromomethane | 30 |
| octafluorocyclobutane | 40 |
| difluoromonochloromethane | 15. |

EXAMPLE 9

| | |
|---|---|
| difluorodichloromethane | 10 |
| trifluoromonobromomethane | 10 |
| octafluorocyclobutane | 70 |
| difluoromonochloromethane | 10. |

EXAMPLE 10

| | |
|---|---|
| difluorodichloromethane | 15 |
| trifluoromonochloromethane | 50 |
| difluoromonochloromethane | 20 |
| difluoromonochloromethane | 15. |

EXAMPLE 11

| | |
|---|---|
| difluorodichloromethane | 15 |
| trifluoromonochloromethane | 20 |
| difluoromonochloroethane | 50 |

-continued

| | |
|---|---|
| difluoromonochloromethane | 15. |

EXAMPLE 12

| | |
|---|---|
| difluorodichloromethane | 10 |
| trifluoromonochloromethane | 10 |
| difluoromonochloroethane | 70 |
| difluoromonochloromethane | 10. |

EXAMPLE 13

| | |
|---|---|
| difluorodichloromethane | 15 |
| trifluoromonochloromethane | 50 |
| difluoromonochlorobromomethane | 20 |
| difluoromonochloromethane | 15. |

EXAMPLE 14

| | |
|---|---|
| difluorodichloromethane | 18 |
| trifluoromonochloromethane | 20 |
| difluoromonochlorobromomethane | 44 |
| difluoromonochloromethane | 18. |

EXAMPLE 15

| | |
|---|---|
| difluorodichloromethane | 10 |
| trifluoromonochloromethane | 10 |
| difluoromonochlorobromomethane | 70 |
| difluoromonochloromethane | 10. |

EXAMPLE 16

| | |
|---|---|
| difluorodichloromethane | 15 |
| octafluorocyclobutane | 60 |
| difluoromonochloromethane | 15 |
| trifluoromonochloromethane | 5 |
| trifluoromonobromomethane | 5. |

EXAMPLE 17

| | |
|---|---|
| difluorodichloromethane | 29 |
| octafluorocyclobutane | 36 |
| difluoromonochloromethane | 11 |
| trifluoromonochloromethane | 12 |
| trifluoromonobromomethane | 12. |

EXAMPLE 18

| | |
|---|---|
| difluorodichloromethane | 10 |
| octafluorocyclobutane | 20 |
| difluoromonochloromethane | 10 |
| trifluoromonochloromethane | 30 |
| trifluoromonobromomethane | 30. |

The tests showed that maximum specific cold capacity of a refrigeration unit functioning with the cooling agent according to the invention was substantially higher than with the use of prior art cooling agents.

Moreover, the cooling temperature may be lowered by increasing the percentage of components having a boiling point below −50° C. at the atmospheric pressure, but this would somewhat lower the specific cold capacity of the refrigeration unit.

The specific cold capacity of the refrigeration unit is substantially improved upon an increase in the content of components having a boiling point above −10° C. at the atmospheric pressure, but this results in an increase in the cooling temperature and it may even become close to the boiling point of the highest boiling component of the cooling agent.

We claim:

1. A multi-component cooling agent for freezing and storing products in a compression refrigerator, comprising components in the following proportions by volume:

| | |
|---|---|
| difluorodichloromethane, | 10–50; |
| at least one component having a normal boiling point within the range from −55° C. to −85° C., | 10–50; |
| a component having a normal boiling point within the range from −30° C. to −55° C., | 10–50; and |
| at least one component having a normal boiling point within the range from +16° C. to −30° C., | 10–75. |

2. A cooling agent according to claim 1, wherein the component having a normal boiling point within the range from −55° C. to −85° C. is $CO_2$, trifluoromonochloromethane, or trifluoromonobromomethane, the component having a normal boiling point within the range from −30° C. to −55° C. is difluoromonochloromethane or propane, and the component having a normal boiling point within the range from +16° C. to −30° C. is difluoromonochloroethane, difluoromonochlorbromomethane or octafluorocyclobutane.

3. A cooling agent according to claim 1 wherein the components are as follows:

| | |
|---|---|
| trifluoromonochloromethane, | 10–50; |
| difluoromonochloromethane, | 10–15; |
| octafluorocyclobutane, | 20–70; and |
| difluorodichloromethane, | the balance. |

4. A cooling agent according to claim 1 wherein the components are as follows:

| | |
|---|---|
| difluorodichloromethane, | 10–15; |
| trifluoromonobromomethane, | 10–50; |
| octafluorocyclobutane, | 20–70; and |
| difluoromonochloromethane, | the balance. |

5. A cooling agent according to claim 1 wherein the components are as follows:

| | |
|---|---|
| difluorodichloromethane, | 10–15; |
| trifluoromonochloromethane, | 10–50; |
| difluoromonochloroethane, | 20–70; and |
| difluoromonochloromethane, | the balance. |

6. A cooling agent according to claim 5, wherein the components are as follows:

| | |
|---|---|
| difluorodichloromethane, | 15; |
| trifluoromonochloromethane, | 20; |

| | |
|---|---|
| -continued | |
| difluoromonochloroethane, | 40; and |
| difluoromonochloromethane, | 25. |

7. A cooling agent according to claim 1 wherein the components are as follows:

| | |
|---|---|
| difluorodichloromethane, | 10–15; |
| trifluoromonochloromethane, | 10–50; |
| difluoromonochlorobromomethane, | 10–80; and |
| difluoromonochloromethane, | the balance. |

8. A cooling agent for freezing and storing products in a compression refrigerator, comprising components in the following proportions by volume:

| | |
|---|---|
| difluorodichloromethane, | 10–20; |
| trifluoromonochloromethane, | 5–30; |
| trifluoromonobromomethane, | 5–30; |
| octafluorocyclobutane, | 20–60; and |
| difluoromonochloromethane, | the balance. |

9. A cooling agent according to claim 1, wherein the components are as follows:

| | |
|---|---|
| difluorodichloromethane, | 22; |
| trifluoromonochloromethane, | 10; |
| trifluoromonobromomethane, | 22; |
| octafluorocyclobutane, | 24; and |
| difluoromonochloromethane, | 22. |

10. A cooling agent according to claim 1 wherein the components are as follows:

| | |
|---|---|
| $CO_2$, | 10–45; |
| difluorodichloromethane, | 10–35; |
| difluoromonochloromethane, | 10–35; and |
| difluoromonochloroethane, | 25–75. |

11. A cooling agent according to claim 10, wherein the components are as follows:

| | |
|---|---|
| $CO_2$, | 14; |
| difluorodichloromethane, | 20; |
| difluoromonochloromethane, | 20; and |
| difluoromonochloroethane, | 46. |

12. The agent of claim 1, wherein said components having a lower boiling point are soluble, in the vapor phase, in said components having a higher boiling point.

13. The agent of claim 1, providing a compression ratio of 3 to 5 in the refrigerator.

14. The agent of claim 13, providing a compression ratio of 4 to 5 in the refrigerator.

15. The agent of claim 1, said agent being condensible at a temperature between 20° C. and 45° C. and pressure between 10 and 14 kg/m$^2$, with said components in a vapor phase at said temperature being soluble in said components in a liquid phase at said temperature and pressure.

* * * * *